June 2, 1964     D. M. STRAIGHT ETAL     3,135,090

ROCKET MOTOR SYSTEM

Filed March 30, 1962     2 Sheets-Sheet 1

INVENTORS
DAVID M. STRAIGHT
JOHN W. GREGORY

BY

ATTORNEYS

INVENTORS
DAVID M. STRAIGHT
JOHN W. GREGORY

BY

ATTORNEYS

United States Patent Office 3,135,090
Patented June 2, 1964

3,135,090
ROCKET MOTOR SYSTEM
David M. Straight, North Olmsted, and John W. Gregory, Parma Heights, Ohio, assignors to the United States of America as represented by the Administrator of the National Aeronautics and Space Administration
Filed Mar. 30, 1962, Ser. No. 183,977
5 Claims. (Cl. 60—35.6)
(Granted under Title 35, U.S. Code (1952), sec. 266)

The invention described herein may be manufactured and used by or for the Government of the United States of America for governmental purposes without the payment of any royalties thereon or therefor.

This invention is concerned with an improved rocket motor system which utilizes a liquid fuel and, more particularly with a rocket motor having means for chemical ignition that is independent of the fuel flow. The invention is especially directed to a compact igniter for engines which burn nonhypergolic liquid propellant combinations.

Various devices have been proposed for the ignition of non-hypergolic liquid propellant rockets including electric sparks, solid pyrotechnic charges and devices which inject liquid ignitor chemicals in advance of the liquid propellant. The electrical spark ignition systems are limited in the amount of ignition energy that can be provided without the use of augmentation chambers which tend to complicate the propellant scheduling control. Also, electric power generation or storage equipment must be carried with the engine to activate the spark system. The solid pyrotechnic ignitors are customarily inserted into the rocket chamber through the nozzle, and this requires the ejection of mechanical parts from the engine after ignition which may cause damage to the engine walls. Previous devices for injecting a liquid ignitor chemical into the combustion chamber simultaneously with the propellants have been complex in that they utilize separate tankage and feed lines, pressurization and purge systems, check valves, loading valves, and shutoff valves which are subject to malfunctioning.

It is, therefore, an object of the invention to provide an improved rocket system having means for chemically igniting non-hypergolic fluid propellant combinations which may be operated independently of the feeding of the propellant with a relatively small initiating impulse.

Another object of the invention is to provide a compact liquid chemical ignition capsule that is entirely self-contained, easily manufactured, and highly reliable in operation.

Still another object of the invention is to provide a chemical ignition system for a fluid propellant rocket which is capable of delivering a relatively high quantity of ignition energy continuously during starting and has a positive shutoff of the injection port after ignition.

A further object of the invention is to provide a liquid ignitor chemical capsule that has great flexibility because of its adaptability to a variety of engine operating conditions and environments.

Other objects and many attendant advantages of the present invention will be apparent from the specification which follows and from the drawings in which like numerals are used throughout to identify like parts.

In order to achieve the aforementioned objects there is provided a rocket motor system of the type having an elongated combustion chamber interposed between a nozzle and an injector, together with a source of liquid propellant that flows through the injector into the combustion chamber. A compact ignition system is mounted adjacent the combustion chamber and the system includes a container of ignitor chemical that is introduced into the combustion chamber independent of the flow of the propellant.

Figure 1:
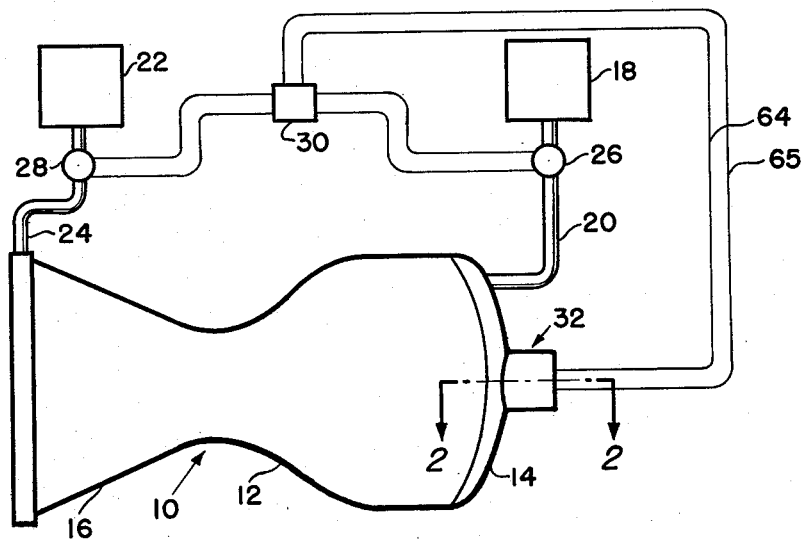
FIG. 1 is a view in elevation of a rocket motor system constructed in accordance with the invention.

Referring to the drawings, there is shown in FIG. 1 a rocket motor system 10 which includes a hollow, elongated combustion chamber 12 interposed between an injector 14 and a nozzle 16. A source of liquid propellant such as a tank 18 is operably connected to the combustion chamber 12 through a supply line 20 that is in communication with the injector 14. A second source of liquid propellant such as a tank 22 is likewise in communication with the combustion chamber 12 through a line 24 that is customarily connected to the nozzle 16 for regenerative cooling. The specific types of propellants in the tanks 18 and 22 form no part of the invention, and any type of non-hypergolic propellant that requires independent ignition may be used. The flow of propellant from the tank 18 is controlled by a valve 26 in the line 20 while the propellant flow from the tank 22 is likewise controlled by a valve 28 in the line 24. If desired, the valves 26 and 28 may be solenoid operated and activated by a suitable timer 30.

According to the invention, an ignitor capsule 32 is mounted adjacent the combustion chamber 12 on the injector 14, as shown in FIG. 1, for introducing liquid ignitor chemicals into the combustion chamber independently of the feeding of the liquid propellants from the tanks 18 and 22. The ignitor capsule 32 comprises a compact assembly of elements which may be readily transported and easily stored until used. The capsule 32 is easily mounted on the injector 14, and while its operation is independent of the flow of propellants from the tanks 18 and 22, it may be actuated by the timer 30.

Figure 2:
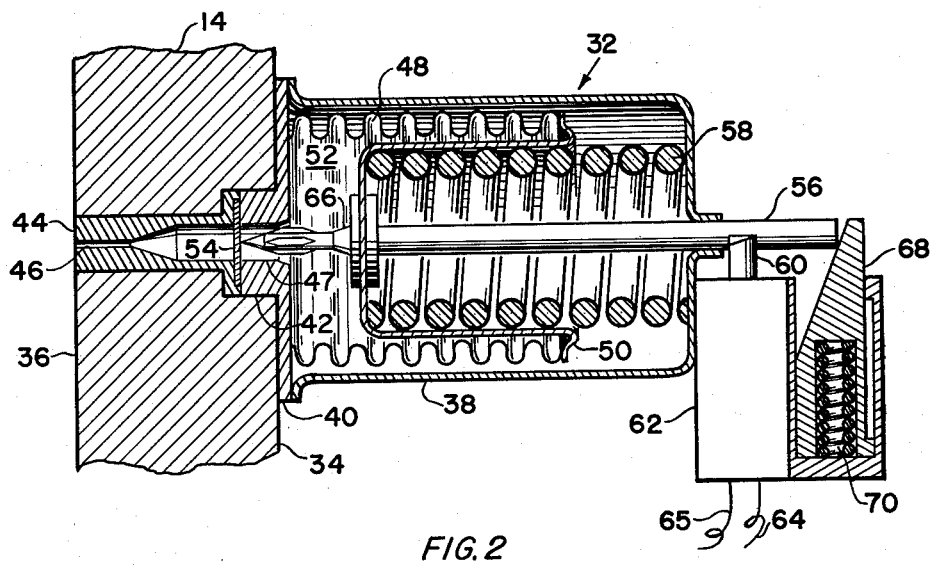
FIG. 2 is an enlarged sectional view taken along the line 2—2 in FIG. 1 showing one embodiment of a capsule assembly utilized in a chemical ignition system constructed in accordance with the invention.

Referring to FIG. 2 the ignitor capsule assembly 32 is mounted on a surface 34 of the injector 14 opposite the injector face 36 in the combustion chamber 12. For convenience, the portion of the injector 14 shown in FIG. 2 is illustrated as being solid; however, the construction of the injector 14 forms no part of the present invention and may be of a number of types. For example, the injector 14 may contain a pair of separated chambers, one for receiving propellant from the line 20, and the other for receiving propellant from the line 24. The propellants are then injected into the chamber 12 through a plurality of orifices.

The capsule assembly 32 comprises a generally cylindrical housing 38 secured to a base plate 40 having a centrally disposed protuberance 42 that is received in a mating depression in the injector 14 so that the base plate 40 engages the surface 34. A nozzle 44 is mounted on the protuberance 42 and extends through an aperture in the injector 14 to the interior of the combustion chamber 12. A passage 46 in the nozzle 44 is aligned with a mating passage 47 in the protuberance 42, and the passage 46 terminates at the injector face 36 to form an orifice.

A spring bellows 48 is mounted in the housing 38 with one end secured to the base plate 40 and the opposite end secured to a cup 50 which forms a movable wall. A liquid ignitor chemical such as chlorine trifluoride is preloaded in a chamber 52 formed by the base plate 40, the spring bellows 48, and the cup 50. Discharge of the ignitor chemical from the chamber 52 through the passages 46 and 47 is prevented by a rupturable diaphragm in the form of a frangible disc 54 mounted between the nozzle 44 and the protuberance 42.

When the liquid ignitor is to be ejected from the chamber 52 into the combustion chamber 12, the disc 54 is ruptured by a pointed plunger 56 that extends through the end of the housing 38 opposite the base plate 40. The plunger 56 is mounted on the movable cup 50, and as this cup moves toward the base plate 40 under the influence of a coil spring 58, the pointed end of the plunger 56 breaks the disc 54. Further movement of the cup 50 ejects the ignitor chemical from the chamber 52 and causes the pointed end of the plunger 56 to move along the passages 46 and 47. The plunger 56 is spaced from the walls of the passages 46 and 47 by radially extending ribs, and the plunger is retained in its retracted position with the spring 58 compressed, as shown in FIG. 2, by a latch pin 60 that engages a slot in the plunger 56. A charge within a cartridge 62 on the end of the housing 38 is exploded by an electric current carried by leads 64 and 65 from any suitable source such as the timer 30 in FIG. 1 to withdraw the latch pin 60. A solenoid may also be used to move the latch pin 60 out of engagement with the plunger 56.

An important feature of the invention is that when substantially all of the ignitor fluid has been expelled from the chamber 52 by the cup 50, the passage 47 is sealed by a tapered portion 66 which seats in a mating entrance portion of the passage 47. The plunger 56 is maintained in its extended position by the spring 58 and movement toward the retracted position is prevented by a tapered pin 68 that is moved to a locking position by a spring 70 as the plunger 56 moves toward the base plate 40.

Figure 3:
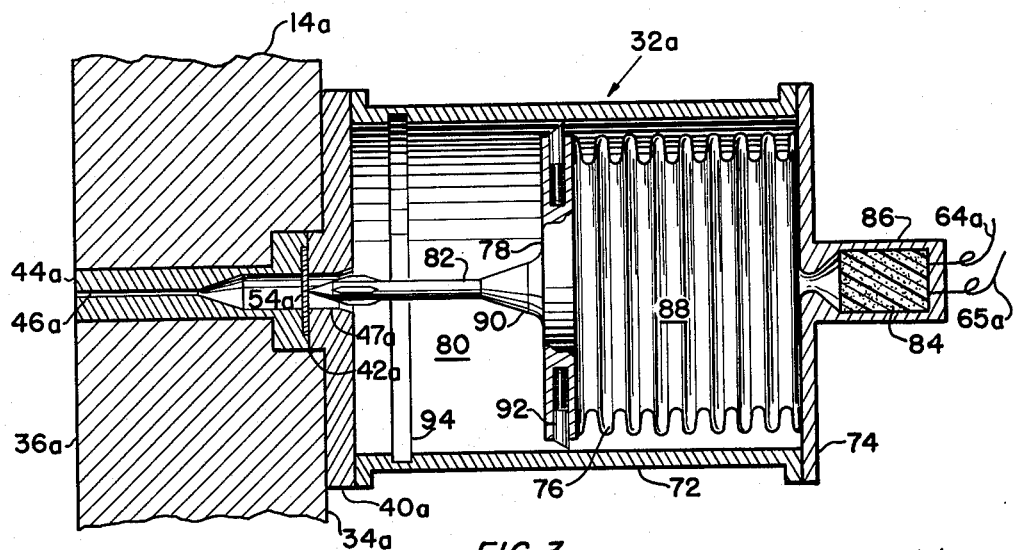
FIG. 3 is an enlarged sectional view illustrating an alternate embodiment of an ignition capsule constructed in accordance with the invention.

Referring now to FIG. 3 there is shown an ignitor cartridge 32a which comprises a generally cylindrical wall 72 having one end secured to a base plate 40a and the opposite end secured to a head plate 74. A spring bellows 76 has one end secured to the head plate 74 and the opposite end secured to a generally circular disc 78 forming a movable wall within the confines of the cylindrical wall 72. A liquid chemical ignitor is preloaded into a chamber 80 formed by the base plate 40a, the cylindrical wall 72, the disc 78, the bellows 76, and a peripheral portion of the head plate 74. Discharge of this fluid through a passage 47a in a protuberance 42a on the base plate 40a and an aligned passage 46a in a nozzle 44a at an injector face 36a is prevented by a frangible disc 54a mounted between the nozzle 44a and the protuberance 42a. The frangible disc 54a is punctured by a pointed plunger 82 carried by the disc 78 during sliding movement into the passage 46a and 47a.

The disc 78 and the plunger 82 are moved by igniting a gas-generating squib 84 by electric leads 64a and 65a. The squib 84 is contained in a cartridge 86 on the head plate 74 that is in communication with an expandable chamber 88 defined by the head plate 74, the bellows 76 and the disc 78. When the squib 84 is ignited the chamber 88 is filled with a gas which moves the disc 78 toward the base plate 40a thereby causing the plunger 82 to pierce the disc 54a, and when all of the ignitor fluid has been expelled from the chamber 80, the passage 47a is sealed by engagement of a tapered portion 90 of the plunger 82 with a mating portion at the entrance of the passage 47a. The plunger 82 is locked in its extended position by spring loaded pins 92 in the disc 78 that engage a circumferential slot 94 in the cylindrical wall 72.

Figure 4:
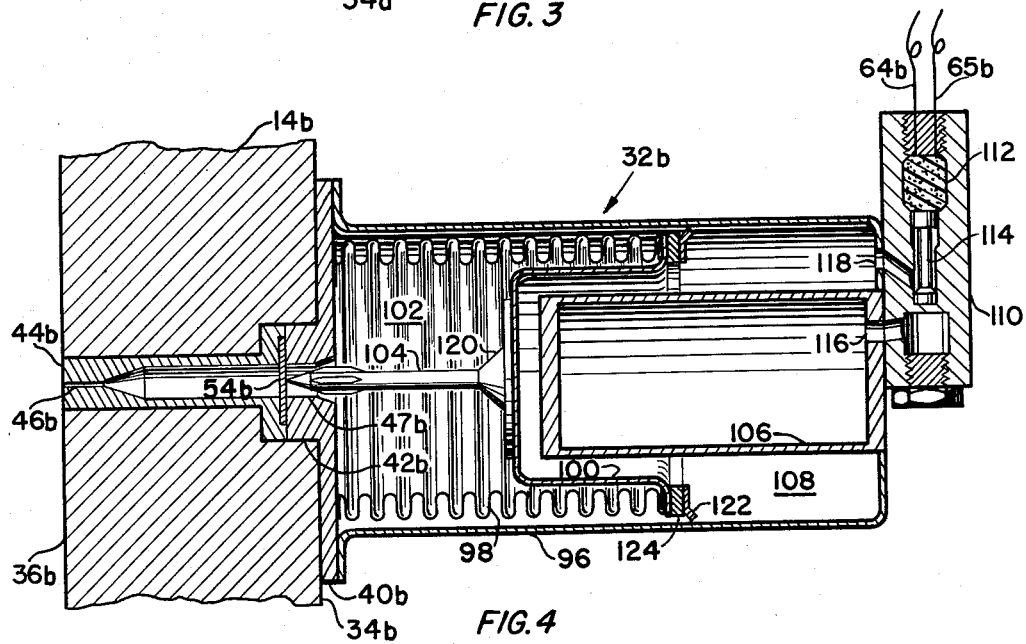
FIG. 4 is an enlarged sectional view of still another embodiment of an ignition capsule constructed in accordance with the invention.

Referring now to FIG. 4 there is shown another embodiment of an ignition capsule 32b which comprises a housing 96 having its normal open end secured to a base plate 40b. A spring bellows 98 within the housing 96 has one end secured to the base plate 40b and its opposite end secured to a cup 100, and the chemical ignitor liquid is preloaded in a chamber 102 formed by the base plates 40b, the bellows 98, and the cup 100. This fluid is retained in the chamber 102 by a frangible disc 54b mounted between a nozzle 44b and a protuberance 42b on the base plate 40b which seals a passage 47b from a passage 46b. The frangible disc 54b is punctured by a pointed plunger 104 mounted on the cup 100 which is moved toward the base plate 40b by permitting a highly pressurized gas in a storage bottle 106 to expand into a chamber 108 on the opposite side of the cup 100 from the chamber 102. The chamber 108 is bounded by a portion of the housing 96, the storage bottle 106, the cup 100, the bellows 98, and a peripheral portion of the base plate 40b. The storage bottle 106 is vented to the chamber 108 by actuating an explosive type valve 110 that is mounted on the end of the housing 96 opposite the base plate 40b. The valve 110 contains an explosive squib 112 that, when ignited by the electrical leads 64b and 65b, shifts a spool 114 to place a passage 116 from the storage bottle 106 in communication with a passage 118 that leads to the chamber 108.

After the valve 110 has been actuated and the ignitor fluid has been expelled from the chamber 102 by movement of the cup 100, the passage 57b is sealed by seating a tapered portion 120 of the plunger 104 adjacent the cup 100 in a mating entrance to the passage 47b. The cup 100 and the plunger 104 are maintained in the extended position with the tapered portion 120 in engagement with the entrance of the passage 47b by a non-return lock washer 122 that is mounted on a ring 124 on the cup 100 adjacent the bellows 98.

While the preferred embodiments of the invention have been disclosed and described, various modifications may be made to the capsule structure without departing from the spirit of the invention or the scope of the subjoined claims. For example, a plurality of capsules may be manifolded for a multiple restart ignition system. Likewise, the capsules may be individually located at various injection ports at the injector face.

What is claimed is:

1. A capsule assembly for injecting an ignitor chemical into a rocket engine through an injector, said capsule assembly comprising
   a plate having a surface for engaging said injector, a protuberance extending from said plate, said protuberance having a first passage extending therethrough,
   a nozzle mounted on said protuberance for extending through said injector, said nozzle having a second passage extending therethrough in substantial alignment with said first passage,
   a housing secured to said plate on the opposite side thereof from said protuberance for containing said ignitor chemical,
   a frangible disc mounted between said nozzle and said protuberance for closing said first and second passages,
   a movable wall within said housing on the opposite side of said ignitor chemical from said plate,
   a plunger for rupturing said disc,
   means for moving said wall and said plunger simultaneously toward said plate whereby said plunger ruptures said disc and said ignitor chemical is ejected through said first and second passages, said plunger having a tapered portion for seating engagement with the entrance to said first passage for sealing the same when substantially all of said ignitor chemical has been ejected, and
   means for maintaining said tapered portion in seating engagement with said entrance to said first passage.

2. A capsule assembly for injecting an ignitor chemical into a rocket engine through an injector, said capsule assembly comprising
   a plate having a protuberance extending from a first surface thereof toward said injector, said protuberance having a first passage extending therethrough,
   a nozzle mounted on said protuberance, said nozzle having a second passage extending therethrough in substantial alignment with said first passage, a housing secured to a second surface on said base plate for containing said ignitor chemical, a frangible disc mounted between said nozzle and said protuberance for closing said first and second passages, a spring bellows positioned within said housing, a movable wall mounted on said spring bellows within said housing on the opposite side of said ignitor chemical from said plate, a plunger mounted on said wall and having an end portion extending into said first passage, means for moving said wall and said plunger toward said plate whereby said end portion of said plunger ruptures said disc and said ignitor chemical is ejected through said first and second passages, said plunger having a tapered portion remote from said end portion and adjacent said wall for seating engagement with the entrance to said first passage and sealing the same when substantially all of said ignitor chemical has been ejected, and locking means for retaining said wall adjacent said plate after said ignitor chemical has been ejected to maintain said tapered portion in seating engagement with said entrance to said first passage.

3. A capsule assembly, as in claim 2, wherein said locking means comprises a pin for engaging the end of said plunger remote from said end portion.

4. A capsule assembly, as in claim 2, wherein said housing has a slot adjacent said plate, and said locking means includes at least one radially extending pin carried by said wall for engaging said slot.

5. A capsule assembly, as in claim 2, wherein said locking means comprises a lock washer carried by said wall for engaging the interior surface of said housing.

References Cited in the file of this patent

UNITED STATES PATENTS

| | | |
|---|---|---|
| 810,403 | Fulton et al. | Jan. 23, 1906 |
| 2,505,798 | Skinner | May 2, 1950 |
| 2,847,148 | Altseimer | Aug. 12, 1958 |
| 2,858,962 | Lucien | Nov. 4, 1958 |
| 2,924,359 | Beremand | Feb. 9, 1960 |
| 2,959,007 | Gregory et al. | Nov. 8, 1960 |
| 2,974,484 | Cooley | Mar. 14, 1961 |